United States Patent
Liao et al.

(10) Patent No.: US 12,529,300 B2
(45) Date of Patent: Jan. 20, 2026

(54) CONTROL SYSTEM AND METHOD OF GAS FLOW FOR IN-SITU URANIUM MINING

(71) Applicants: Beijing Institute of Chemical Metallurgy, Nuclear Industry, Beijing (CN); CNNC Mining Technology Group Co., Ltd, Beijing (CN)

(72) Inventors: Wensheng Liao, Beijing (CN); Hao Jia, Beijing (CN); Limin Wang, Beijing (CN); Zhiming Du, Beijing (CN); Xiang Chen, Beijing (CN); Yuan Yuan, Beijing (CN); Ying Xu, Beijing (CN)

(73) Assignees: Beijing Institute of Chemical Metallurgy, Nuclear Industry, Beijing (CN); CNNC Mining Technology Group Co., Ltd, Beijing (CN)

( * ) Notice: Subject to any disclaimer, the term of this patent is extended or adjusted under 35 U.S.C. 154(b) by 0 days.

(21) Appl. No.: 19/086,518

(22) Filed: Mar. 21, 2025

(65) Prior Publication Data
US 2025/0297542 A1 Sep. 25, 2025

(30) Foreign Application Priority Data
Mar. 25, 2024 (CN) .......................... 202410344505.3

(51) Int. Cl.
*F17C 13/04* (2006.01)
*E21B 43/28* (2006.01)
(52) U.S. Cl.
CPC .................................. *E21B 43/28* (2013.01)
(58) Field of Classification Search
CPC ................ E21B 43/28; Y02P 10/20
See application file for complete search history.

(56) References Cited

U.S. PATENT DOCUMENTS

2007/0204702 A1* 9/2007 Melcer .................. G01F 15/043
 73/861
2019/0258279 A1* 8/2019 Penley .................... G05D 11/13

FOREIGN PATENT DOCUMENTS

CN 109577940 * 4/2021
CN 216553895 U 5/2022

OTHER PUBLICATIONS

CNIPA, Notification of First Office Action for CN202410344505.3, Jul. 2, 2024.
(Continued)

*Primary Examiner* — Carib A Oquendo
(74) *Attorney, Agent, or Firm* — Zhigang Ma

(57) ABSTRACT

A control system of gas flow for in-situ uranium mining includes: a gas mass flow controller, a gas inlet assembly, an automatic liquid discharge assembly, a gas outlet assembly, a control assembly and a pressure collection assembly. The gas inlet assembly is connected to an outlet of the gas mass flow controller; the automatic liquid discharge assembly is configured to discharge backflow liquid; the gas outlet assembly is configured to prevent backflow of an injection pipe; the control assembly is electrically connected to the gas mass flow controller, the gas outlet assembly, and the automatic liquid discharge assembly; and the pressure collection assembly includes a first sensor and a second sensor, the first sensor is disposed between the automatic liquid discharge assembly and the gas inlet assembly, and the second sensor is disposed between the injection pipe and the gas outlet assembly.

10 Claims, 2 Drawing Sheets

(56) References Cited

OTHER PUBLICATIONS

Beijing Institute of Chemical Metallurgy and Nuclear Industry, China Nuclear Mining Science and Technology Group Co., Ltd. (Applicant), Replacement claims (allowed) of CN202410344505.3, Jul. 25, 2024.

CNIPA, Notification to grant patent right for invention in CN202410344505.3, Aug. 22, 2024.

* cited by examiner

CONTROL SYSTEM AND METHOD OF GAS FLOW FOR IN-SITU URANIUM MINING

CROSS-REFERENCE TO RELATED APPLICATION

This application claims priority to Chinese Patent Application No. 202410344505.3, filed Mar. 25, 2024, which is herein incorporated by reference in its entirety.

TECHNICAL FIELD

The disclosure relates to the field of flow control technologies for in-situ uranium mining, and more particularly to a control system of gas flow for in-situ uranium mining and a control method of gas flow for in-situ uranium mining.

BACKGROUND

In-situ uranium mining (also referred to as in-situ leaching of uranium) is a main mining process for natural uranium in the world. At present, an in-situ uranium ming process with carbon dioxide ($CO_2$) and oxygen ($O_2$) is popular in the countries, such as US, China, Pakistan, etc. In this process, $O_2$ and $CO_2$ gases need to be introduced into an injection system. Therefore, the stability, accurate measurement, and control of gas flow are extremely important. In the related art, backflow in injection pipes can cause significant pressure fluctuations, preventing the gases from being continuously injected in a normal manner. This leads to low efficiency in an in-situ uranium mining operation. Thus, there is an urgent need for a control system of gas flow for in-situ uranium mining and a control method of gas flow for in-situ uranium mining to effectively avoid the interference from the significant pressure fluctuations caused by the backflow in the injection pipes during gas injection.

SUMMARY

In order to improve the above problems, a purpose of the disclosure is to provide a control system of gas flow for in-situ uranium mining and a control method of gas flow for in-situ uranium mining. To achieve the above purpose, technical solutions adopted by the disclosure are as follows.

In an aspect, the disclosure provides a control system of gas flow for in-situ uranium mining, and the control system includes: a gas mass flow controller, a gas inlet assembly, an automatic liquid discharge assembly, a gas outlet assembly, a control assembly and a pressure collection assembly. The gas inlet assembly is connected to an outlet of the gas mass flow controller; the automatic liquid discharge assembly is connected to an outlet of the gas inlet assembly, and the automatic liquid discharge assembly is configured to discharge backflow liquid; the gas outlet assembly is disposed between the automatic liquid discharge assembly and an injection pipe, and the gas outlet assembly is configured to prevent backflow of the injection pipe; the control assembly is electrically connected to the gas mass flow controller, the gas outlet assembly, and the automatic liquid discharge assembly; and the pressure collection assembly includes a first sensor and a second sensor, the first sensor is disposed between the automatic liquid discharge assembly and the gas inlet assembly, and the second sensor is disposed between the injection pipe and the gas outlet assembly.

In an embodiment, the gas inlet assembly includes a pressure stabilizing valve, an inlet globe valve and a first check valve, an inlet of the pressure stabilizing valve is connected to the gas mass flow controller, an outlet of the pressure stabilizing valve is connected to the inlet globe valve, the inlet globe valve is disposed between the first check valve and the pressure stabilizing valve, and the first check valve is disposed between the automatic liquid discharge assembly and the inlet globe valve.

In an embodiment, the automatic liquid discharge assembly includes a liquid discharge buffer tank, a liquid level meter and a flow control valve, a gas inlet of the liquid discharge buffer tank is connected to the gas inlet assembly, the flow control valve is disposed on a lower outlet of the liquid discharge buffer tank, and the liquid level meter is disposed in the liquid discharge buffer tank.

In an embodiment, the gas outlet assembly includes a solenoid valve and a second check valve, the second check valve is disposed between the injection pipe and the automatic liquid discharge assembly, and the solenoid valve is disposed between the second check valve and the automatic liquid discharge assembly.

In another aspect, the disclosure provides a control method of gas flow for in-situ uranium mining, and the control method includes:
acquiring first pressure information and second pressure information;
calculating third pressure information according to the first pressure information and the second pressure information;
determining whether the third pressure information is greater than a pressure threshold value to obtain a first determination result; and
determining whether to close the solenoid valve according to the first determination result.

In an embodiment, after the determining whether to close the solenoid valve according the first determination result, the control method further includes:
acquiring liquid level height information, where the liquid level height information is a liquid level height of the backflow liquid in the liquid discharge buffer tank;
calculating first information according to the liquid level height information and a total height of the liquid discharge buffer tank, where the first information is a ratio of the liquid level height of the backflow liquid in the liquid discharge buffer tank to the total height of the liquid discharge buffer tank; and
determining an opening degree of the flow control valve according to the third pressure information and the first information.

In an embodiment, the determining an opening degree of the flow control valve according to the third pressure information and the first information includes:
acquiring first threshold value information, where the first threshold value information is 0;
determining whether the third pressure information is greater than the first threshold value information to obtain a second determination result;
determining whether the first information is less than the liquid level threshold value to obtain a third determination result; and
sending a first control command, when the second determination result indicates that the third pressure information is greater than the first threshold value information and the third determination result indicates that the first information is less than the liquid level threshold value, where the first control command is configured to adjust the opening degree of the flow control valve to 0.

In an embodiment, the determining an opening degree of the flow control valve according to the third pressure information and the first information further includes:

determining whether the third pressure information is less than first threshold value information to obtain a fourth determination result;

determining whether the first information is greater than the liquid level threshold value to obtain a fifth determination result; and sending a second control command, when the fourth determination result indicates that the third pressure information is less than the first threshold value information and the fifth determination result indicates that the first information is greater than the liquid level threshold value, where the second control command is configured to adjust the opening degree of the flow control valve to 1.

In an embodiment, the determining an opening degree of the flow control valve according to the third pressure information and the first information further includes:

determining whether the third pressure information is greater than the pressure threshold value to obtain a sixth determination result;

determining whether the first information is equal to the liquid level threshold value to obtain a seventh determination result; and sending a third control command, when the sixth determination result indicates that the third pressure information is greater than the pressure threshold value and the seventh determination result indicates that the first information is equal to the liquid level threshold value, where the third control command is configured to adjust the opening degree of the flow control valve to 0.01.

In an embodiment, the determining an opening degree of the flow control valve according to the third pressure information and the first information further includes:

determining whether the third pressure information is greater than first threshold value information and less than the pressure threshold value to obtain an eighth determination result;

determining whether the first information is greater than the liquid level threshold value to obtain a ninth determination result;

calculating, according to the first information, the opening degree of the flow control valve to obtain opening degree information, when the eighth determination result indicates that the third pressure information is greater than the first threshold value information and less than the pressure threshold value and the ninth determination result indicates that the first information is greater than the liquid level threshold value; and sending a fourth control command according to the opening degree information, where the fourth control command is configured to adjust the opening degree of the flow control valve.

Beneficial effects of the disclosure are as follows.

The control system of the gas flow for the in-situ uranium mining provided by the disclosure achieves integrated remote and on-site control by electrically connecting the gas mass flow controller, the gas outlet assembly, and the automatic liquid discharge assembly through the control assembly. In addition, by finely regulating the flow control valve in the automatic liquid discharge assembly through the control assembly, accuracy of liquid discharge is improved. This effectively avoids interference caused by backflow due to significant pressure fluctuations in the injection pipe, which could lead to backflow during the in-situ uranium mining. As a result, operational efficiency of the in-situ leaching of uranium is enhanced.

Other features and advantages of the disclosure will be described in the following specification, and in part will become apparent from the description, or may be understood by practicing the embodiments of the disclosure. The purposes and advantages of the disclosure may be realized and obtained by means of the structures particularly pointed out in the written description, claims, and drawings.

BRIEF DESCRIPTION OF DRAWING

In order to more clearly illustrate the technical solutions of the embodiments of the disclosure, the accompanying drawings used in the embodiments will be briefly introduced below. It should be understood that the accompanying drawings below only show some embodiments of the disclosure and should not be regarded as limitations on the scope. For those skilled in the art, other relevant drawings can also be obtained based on these accompanying drawings without making inventive efforts.

Figure 1:
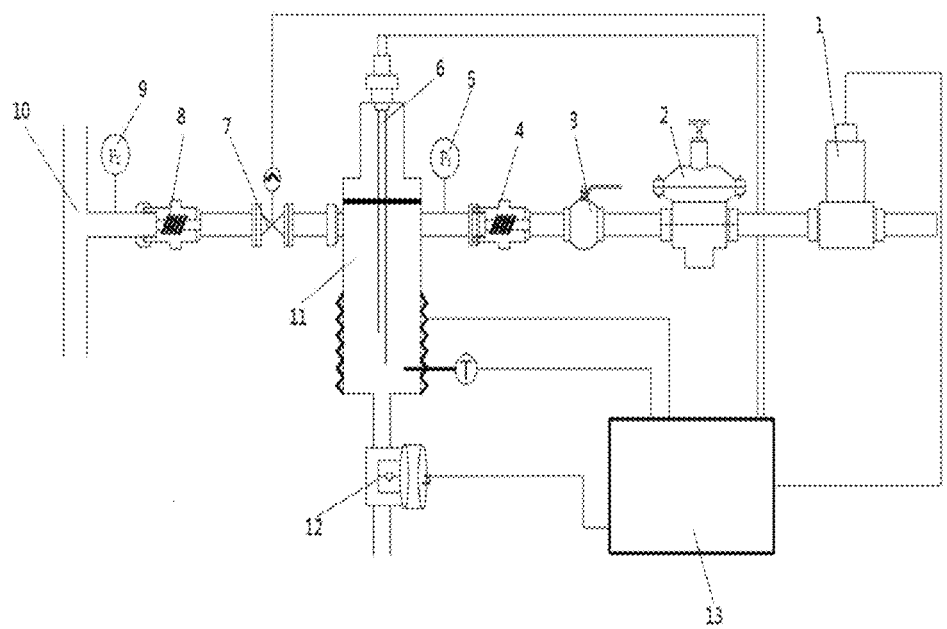
FIG. 1 illustrates a schematic structural diagram of a control system of gas flow for in-situ uranium mining according to an embodiment of the disclosure.

Descriptions of numeral references in the drawing are that: 1, gas mass flow controller, 2; pressure stabilizing valve; 3, inlet globe valve; 4, first check valve; 5, first sensor; 6, liquid level meter; 7, solenoid valve; 8, second check valve; 9, second sensor; 10, injection pipe; 11, liquid discharge buffer tank; 12, flow control valve; 13, control assembly.

DETAILED DESCRIPTION OF EMBODIMENTS

To make the objectives, technical solutions, and advantages of the embodiments of the disclosure clearer, the following will provide a clear and complete description of the technical solutions in the embodiments of the disclosure in conjunction with the accompanying drawings. Apparently, the described embodiments are only a part of the embodiments of the disclosure and are not all of the embodiments. The components described and shown in the accompanying drawings of the disclosure can be arranged and designed in various different configurations. Therefore, the detailed description of the embodiments of the disclosure provided here, with reference to the accompanying drawings, is not intended to limit the scope of the claimed disclosure, but merely represents selected embodiments of the disclosure. Based on the embodiments of the disclosure, any other embodiments obtained by those skilled in the art without making inventive efforts are also within the scope of protection of the disclosure.

It should be noted that similar reference numerals and letters in the figures below denote similar items. Therefore, once an item is defined in a figure, it does not need to be further defined or explained in subsequent figures. Additionally, in the description of the disclosure, terms such as "first", "second", etc., are used are only used to distinguish descriptions and should not be understood as indicating or implying relative importance.

First Embodiment

As shown in FIG. 1, the first embodiment provides a control system of gas flow for in-situ uranium mining. The control system includes: a gas mass flow controller 1, a gas inlet assembly, an automatic liquid discharge assembly, a gas outlet assembly, a control assembly 13 and a pressure collection assembly. The gas inlet assembly is connected to an outlet of the gas mass flow controller 1. The automatic liquid discharge assembly is connected to an outlet of the gas inlet assembly, and the automatic liquid discharge assembly is configured to discharge backflow liquid. The gas outlet assembly is disposed between the automatic liquid discharge assembly and an injection pipe 10, and the gas outlet assembly is configured to prevent backflow of the injection pipe 10. The control assembly 13 is electrically connected to the gas mass flow controller 1, the gas outlet assembly, and the automatic liquid discharge assembly. The pressure collection assembly includes a first sensor 5 and a second sensor 9. The first sensor 5 is disposed between the automatic liquid discharge assembly and the gas inlet assembly, and the second sensor 9 is disposed between the injection pipe 10 and the gas outlet assembly. In the first embodiment, gas enters the automatic liquid discharge assembly after passing through the gas mass flow controller 1, the gas inlet assembly, and the first sensor 5, and is then injected into the injection pipe 10 through the gas outlet assembly and the second sensor 9. When the backflow occurs in the injection pipe 10, the backflow liquid enters the automatic liquid discharge assembly through the second sensor 9 and the gas outlet assembly and is discharged. The control system achieves integrated remote and on-site control by electrically connecting the gas mass flow controller 1, the gas outlet assembly, and the automatic liquid discharge assembly through the control assembly 13. In addition, the control assembly 13 is configured to finely regulate a flow control valve in the automatic liquid discharge assembly. This effectively prevents the interference caused by the backflow due to significant pressure fluctuations of the injection pipe 10 in a gas injection process for the in-situ uranium mining, thereby improving the operational efficiency of the in-situ uranium mining.

Figure 2:
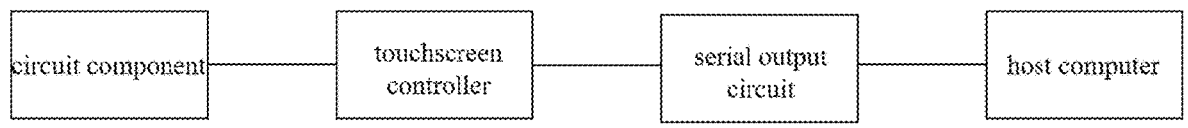
FIG. 2 illustrates a schematic structural diagram of a control assembly according to the embodiment of the disclosure.

As shown in FIG. 2, it should be noted that the control assembly 13 includes a circuit component, a touchscreen controller, a serial output circuit and a host computer. The circuit component is electrically connected to the touchscreen controller, and the touchscreen controller is electrically connected to the serial output circuit. The host computer is electrically connected to the serial output circuit. The circuit component is configured to collect and process analog signals, and the serial output circuit and the host computer are configured to generate control signals.

In a specific embodiment of the disclosure, the gas inlet assembly includes a pressure stabilizing valve 2, an inlet globe valve 3 and a first check valve 4. An inlet of the pressure stabilizing valve 2 is connected to the gas mass flow controller 1, and an outlet of the pressure stabilizing valve 2 is connected to the inlet globe valve 3. The inlet globe valve 3 is disposed between the first check valve 4 and the pressure stabilizing valve 2. The first check valve 4 is disposed between the automatic liquid discharge assembly and the inlet globe valve 3.

In the specific embodiment of the disclosure, the automatic liquid discharge assembly includes a liquid discharge buffer tank 11, a liquid level meter 6 and a flow control valve 12. A gas inlet of the liquid discharge buffer tank 11 is connected to the gas inlet assembly. The flow control valve 12 is disposed on a lower outlet of the liquid discharge buffer tank 11. The liquid level meter 6 is disposed in the liquid discharge buffer tank 11. When the backflow occurs, the backflow liquid enters the liquid discharge buffer tank 11, and a liquid level of the backflow liquid is recorded by the liquid level meter 6. When the liquid level of the backflow liquid reaches a preset alarm liquid level, an alarm interrupt program is triggered. A control program in the touchscreen controller of the control assembly 13 determines whether a pressure difference between the first sensor 5 and the second sensor 9 exceeds a normal pressure difference. An opening degree of the flow control valve 12 is then determined based on the pressure difference between the first sensor 5 and the second sensor 9 to achieve fine control of the control system. This ensures that the gas can still be continuously injected during the in-situ uranium mining despite pressure fluctuations.

In the specific embodiment of the disclosure, the gas outlet assembly includes a solenoid valve 7 and a second check valve 8. The second check valve 8 is disposed between the injection pipe 10 and the automatic liquid discharge assembly. The solenoid valve 7 is disposed between the second check valve 8 and the automatic liquid discharge assembly. When the backflow occurs, the solenoid valve 7 is adjusted according to the pressure difference between the first sensor 5 and the second sensor 9, enabling the control system to operate stably and reliably.

Second Embodiment

The second embodiment provides a control method of the gas flow for the in-situ uranium mining, and the control method includes the following steps.

Step S1, first pressure information and second pressure information are acquired.

In the step S1, the first pressure information between the gas inlet assembly and the automatic liquid discharge assembly is collected by the first sensor 5 and is denoted as $P_1$. The second pressure information between the gas outlet assembly and the injection pipe 10 is collected by the second sensor 9 and is denoted as $P_2$.

Step S2, third pressure information is calculated according to the first pressure information and the second pressure information.

In the step S2, the third pressure information, which represents the pressure difference, is obtained by subtracting the second pressure information ($P_2$) from the first pressure information ($P_1$).

Step S3, a first determination result is obtained by determining whether the third pressure information is greater than a pressure threshold value.

In the step S3, the pressure threshold value is 0.01 megapascals (MPa).

Step S4, whether to close the solenoid valve 7 is determined according to the first determination result.

In the step S4, normalcy of gas injection is determined according to the pressure difference $P_1-P_2$. When $P_1-P_2$ is greater than 0.01 MPa, the gas injection is normal. When $P_1-P_2$ is between 0 and 0.01 MPa, the gas injection is in an alert range, triggering the alarm interrupt program and causing the control assembly 13 to send a yellow alarm to alert the control system of gas injection risks. When $P_1-P_2$ is less than 0, the control assembly 13 sends a red alarm and controls the solenoid valve 7 to be closed.

After the step S4, the control method further includes step S5, step S6 and step S7.

Step S5, liquid level height information is acquired. The liquid level height information is a liquid level height of the backflow liquid in the liquid discharge buffer tank 11.

Step S6, first information is calculated according to the liquid level height information and a total height of the liquid discharge buffer tank 11. The first information is a ratio of the liquid level height of the backflow liquid in the liquid discharge buffer tank 11 to the height of the liquid discharge buffer tank 11.

Step S7, an opening degree of the flow control valve 12 is determined according to the third pressure information and the first information.

The step S7 includes steps S701, S702, S703, and S704.

Step S701, first threshold value information is acquired. The first threshold value information is 0.

Step S702, a second determination result is obtained by determining whether the third pressure information is greater than the first threshold value information.

Step S703, a third determination result is obtained by determining whether the first information is less than the liquid level threshold value.

Step S704, when the second determination result indicates that the third pressure information is greater than the first threshold value information and the third determination result indicates that the first information is less than the liquid level threshold value, a first control command is sent. The first control command is configured to adjust the opening degree of the flow control valve 12 to 0.

In this embodiment, the liquid level threshold value is 0.5. When the first information, i.e., a ratio of $H_1$ to $H_2$ ($H_1/H_2$), is less than 0.5 and $P_1-P_2$ is greater than 0, the opening degree of the flow control valve 12 is adjusted to 0. At this time, the pressure at the first sensor 5 is greater than the pressure at the second sensor 9, and the liquid level height of the backflow liquid in the liquid discharge buffer tank 11 is not reached a warning height. Therefore, the backflow liquid will not enter the gas inlet assembly to contaminate the gas mass flow controller 1. It should be noted that $H_1$ represents the liquid level height of the backflow liquid in the liquid discharge buffer tank 11, and $H_2$ represents the total height of the liquid discharge buffer tank 11.

The step S7 further includes steps S705, S706 and S707.

Step S705, a fourth determination result is obtained by determining whether the third pressure information is less than first threshold value information.

Step S706, a fifth determination result is obtained by determining whether the first information is greater than the liquid level threshold value.

Step S707, when the fourth determination result indicates that the third pressure information is less than the first threshold value information, and the fifth determination result indicates that the first information is greater than the liquid level threshold value, a second control command is sent. The second control command is configured to adjust the opening degree of the flow control valve 12 to 1.

In this embodiment, when $H_1/H_2$ exceeds 0.5, the alarm interrupt program is triggered. At this point, the opening degree of the flow control valve 12 is determined based on a value of $P_1-P_2$. When $P_1-P_2$ is less than 0, it indicates that the backflow liquid in the liquid discharge buffer tank 11 is highly likely to flow into the gas inlet assembly, thereby contaminating the gas mass flow controller 1. Therefore, the control assembly 13 sends a control signal to the solenoid valve 7 and sends the second control command to the flow control valve 12 to discharge liquid at a maximum opening degree. When the liquid level in the liquid discharge buffer tank 11 reaches a preset lower limit, the flow control valve 12 is closed. When the value of $P_1-P_2$ returns to a normal range, the solenoid valve 7 is opened to resume normal gas injection.

The step S7 further includes steps S708, S709 and S710.

Step S708, a sixth determination result is obtained by determining whether the third pressure information is greater than the pressure threshold value.

Step S709, a seventh determination result is obtained by determining whether the first information is equal to the liquid level threshold value.

Step S710, when the sixth determination result indicates that the third pressure information is greater than the pressure threshold value and the seventh determination result indicates that the first information is equal to the liquid level threshold value, a third control command is sent. The third control command is configured to adjust the opening degree of the flow control valve 12 to 0.01.

In this embodiment, when $P_1-P_2$ is greater than 0.01 MPa and $H_1/H_2$ is equal to 0.5, the flow control valve 12 is controlled to discharge the liquid at a minimum opening degree of 0.01. The gas injection continues throughout the liquid discharge process to prevent low efficiency in the in-situ leaching uranium mining due to lack of the gas injection, thereby effectively improving the operational efficiency of the in-situ leaching uranium mining.

The step S7 further includes steps S711, S712, S713 and S714.

Step S711, an eighth determination result is obtained by determining whether the third pressure information is greater than first threshold value information and less than the pressure threshold value.

Step S712, a ninth determination result is obtained by determining whether the first information is greater than the liquid level threshold value.

Step S713, when the eighth determination result indicates that the third pressure information is greater than the first threshold value information and less than the pressure threshold value, and the ninth determination result indicates that the first information is greater than the liquid level threshold value, opening degree information is obtained by calculating the opening degree of the flow control valve 12 according to the first information.

In the step S713, the opening degree information is obtained through the following formula:

$$\xi = 10*(H_1/H_2 - 0.5)/3$$

where $\xi$ represents the opening degree information, $H_1$ represents the liquid level height of the backflow liquid in the liquid discharge buffer tank 11, and $H_2$ represents the total height of the liquid discharge buffer tank 11.

Step S714, a fourth control command is sent according to the opening degree information. The fourth control command is configured to adjust the opening degree of the flow control valve 12.

In this embodiment, when $0<P_1-P_2\leq0.01$ MPa and $H_1/H_2$ is greater than 0.5, the injection pressure is variable, being sometimes high and sometimes low. To prevent the pressure fluctuations from causing liquid in the liquid discharge buffer tank 11 to flow into the gas inlet assembly, the opening degree of the flow control valve 12 is determined based on the first information. This effectively controls discharge rate of the liquid in the liquid discharge buffer tank 11 and ensures that the gas mass flow controller 1 is not contaminated.

In the disclosure, fine control of the flow control valve 12 ensures continuous gas injection during the in-situ uranium mining, preventing the gas inlet assembly from being contaminated by the backflow liquid, thereby improving the operational efficiency of the in-situ uranium mining process.

In the description of the disclosure, it should be noted that terms such as "center", "up", "down", "left", "right", "vertical", "horizontal", "inner", "outer", etc., are used to indicate the orientation or positional relationships based on the orientation or positional relationships shown in the accompanying drawings, or the orientation or positional relationships when the product of the disclosure is conventionally placed in use. These terms are used merely for the convenience of describing the disclosure and simplifying the description, and should not be construed as indicating or implying that the device or element must have a specific orientation, or be constructed and operated in a specific orientation. Therefore, these terms should not be interpreted as limiting the disclosure. Additionally, terms such as "first", "second", "third," etc., are only used to distinguish descriptions and should not be understood as indicating or implying relative importance.

In the description of the disclosure, it should also be noted that, unless otherwise explicitly specified and defined, the terms "disposed", "installed", "connected" and "coupled" should be broadly understood. For example, these terms can be fixed connections, detachable connections, or integral connections; they can be directly connected, indirectly connected through an intermediate medium, or connected internally between two components. For those skilled in the art, the specific meanings of the above terms in the context of the disclosure can be understood according to the specific circumstances.

The above description is merely the specific embodiments of the disclosure and is not intended to limit the disclosure. For those skilled in the art, various modifications and variations can be made to the disclosure. Any modifications, equivalent substitutions, improvements, and the like made within the spirit and principles of the disclosure should be included within the scope of protection of the disclosure.

The above description is merely a specific implementation of the disclosure, and the scope of protection of the disclosure is not limited to this. Those skilled in the art can easily conceive of variations or substitutions within the technical scope disclosed by the disclosure, and these should all be included within the scope of protection of the disclosure. Therefore, the scope of protection of the disclosure should be determined by the scope of the claims.

What is claimed is:

1. A control system of gas flow for in-situ uranium mining, comprising:
   a gas mass flow controller (1);
   a gas inlet assembly, wherein the gas inlet assembly is connected to an outlet of the gas mass flow controller (1);
   an automatic liquid discharge assembly, wherein the automatic liquid discharge assembly is connected to an outlet of the gas inlet assembly, and the automatic liquid discharge assembly is configured to discharge backflow liquid;
   a gas outlet assembly, wherein the gas outlet assembly is disposed between the automatic liquid discharge assembly and an injection pipe (10), and the gas outlet assembly is configured to prevent backflow of the injection pipe (10);
   a control assembly (13), wherein the control assembly (13) is electrically connected to the gas mass flow controller (1), the gas outlet assembly, and the automatic liquid discharge assembly; and
   a pressure collection assembly, wherein the pressure collection assembly comprises a first sensor (5) and a second sensor (9), the first sensor (5) is disposed between the automatic liquid discharge assembly and the gas inlet assembly, and the second sensor (9) is disposed between the injection pipe (10) and the gas outlet assembly;
   wherein the gas outlet assembly comprises a solenoid valve (7) and a check valve (8), the check valve (8) is disposed between the injection pipe (10) and the automatic liquid discharge assembly, and the solenoid valve (7) is disposed between the check valve (8) and the automatic liquid discharge assembly;
   wherein the control assembly (13) comprises a circuit component, a touchscreen controller, a serial output circuit and a host computer, the circuit component is electrically connected to the touchscreen controller, the touchscreen controller is electrically connected to the serial output circuit, and the host computer is electrically connected to the serial output circuit; and the circuit component is configured to collect and process analog signals, and the serial output circuit and the host computer are configured to generate control signals;
   wherein the automatic liquid discharge assembly comprises a liquid discharge buffer tank (11), a liquid level meter (6) and a flow control valve (12), a gas inlet of the liquid discharge buffer tank (11) is connected to the gas inlet assembly, the flow control valve (12) is disposed on a lower outlet of the liquid discharge buffer tank (11), and the liquid level meter (6) is disposed in the liquid discharge buffer tank (11);
   wherein the gas inlet assembly comprises a pressure stabilizing valve (2), an inlet globe valve (3) and another check valve (4), an inlet of the pressure stabilizing valve (2) is connected to the gas mass flow controller (1), an outlet of the pressure stabilizing valve (2) is connected to the inlet globe valve (3), the inlet globe valve (3) is disposed between the another check valve (4) and the pressure stabilizing valve (2), and the another check valve (4) is disposed between the automatic liquid discharge assembly and the inlet globe valve (3); and
   wherein the first sensor (5) is configured to measure first pressure information between the automatic liquid discharge assembly and the gas inlet assembly, and the second sensor (9) is configured to measure second pressure information between the injection pipe (10) and the gas outlet assembly; the touchscreen controller of the control assembly (13) is configured to determine an opening degree of the flow control valve (12) based on a pressure difference between the first pressure information and the second pressure information and control the flow control valve (12) based on the opening degree, to thereby achieve control of the control system, ensuring a stable and reliable operation of the control system.

2. A control method of gas flow for in-situ uranium mining, implemented by the control system of the gas flow for the in-situ uranium mining as claimed in claim 1, the control method comprising:
   acquiring the first pressure information and the second pressure information;
   calculating third pressure information according to the first pressure information and the second pressure information;

determining whether the third pressure information is greater than a pressure threshold value to obtain a first determination result; and determining whether to close the solenoid valve (7) according to the first determination result.

3. The control method of the gas flow for the in-situ uranium mining as claimed in claim 2, wherein after the determining whether to close the solenoid valve according the first determination result, the control method further comprises:

acquiring liquid level height information, wherein the liquid level height information is a liquid level height of the backflow liquid in the liquid discharge buffer tank (11);

calculating first information according to the liquid level height information and a total height of the liquid discharge buffer tank (11), wherein the first information is a ratio of the liquid level height of the backflow liquid in the liquid discharge buffer tank (11) to the total height of the liquid discharge buffer tank (11); and determining the opening degree of the flow control valve (12) according to the third pressure information and the first information.

4. The control method of the gas flow for the in-situ uranium mining as claimed in claim 3, wherein the determining an opening degree of the flow control valve according to the third pressure information and the first information comprises:

acquiring first threshold value information, wherein the first threshold value information is 0;

determining whether the third pressure information is greater than the first threshold value information to obtain a second determination result;

determining whether the first information is less than a liquid level threshold value to obtain a third determination result; and sending a first control command, when the second determination result indicates that the third pressure information is greater than the first threshold value information and the third determination result indicates that the first information is less than the liquid level threshold value, wherein the first control command is configured to adjust the opening degree of the flow control valve (12) to 0.

5. The control method of the gas flow for the in-situ uranium mining as claimed in claim 3, wherein the determining an opening degree of the flow control valve according to the third pressure information and the first information further comprises:

determining whether the third pressure information is less than first threshold value information to obtain a fourth determination result;

determining whether the first information is greater than a liquid level threshold value to obtain a fifth determination result; and sending a second control command, when the fourth determination result indicates that the third pressure information is less than the first threshold value information and the fifth determination result indicates that the first information is greater than the liquid level threshold value, wherein the second control command is configured to adjust the opening degree of the flow control valve (12) to 1.

6. The control method of the gas flow for the in-situ uranium mining as claimed in claim 3, wherein the determining an opening degree of the flow control valve according to the third pressure information and the first information further comprises:

determining whether the third pressure information is greater than the pressure threshold value to obtain a sixth determination result;

determining whether the first information is equal to a liquid level threshold value to obtain a seventh determination result; and sending a third control command, when the sixth determination result indicates that the third pressure information is greater than the pressure threshold value and the seventh determination result indicates that the first information is equal to the liquid level threshold value, wherein the third control command is configured to adjust the opening degree of the flow control valve (12) to 0.01.

7. The control method of the gas flow for the in-situ uranium mining as claimed in claim 3, wherein the determining an opening degree of the flow control valve according to the third pressure information and the first information further comprises:

determining whether the third pressure information is greater than first threshold value information and less than the pressure threshold value to obtain an eighth determination result;

determining whether the first information is greater than a liquid level threshold value to obtain a ninth determination result;

calculating, according to the first information, the opening degree of the flow control valve (12) to obtain opening degree information, when the eighth determination result indicates that the third pressure information is greater than the first threshold value information and less than the pressure threshold value and the ninth determination result indicates that the first information is greater than the liquid level threshold value; and sending a fourth control command according to the opening degree information, wherein the fourth control command is configured to adjust the opening degree of the flow control valve (12).

8. The control system of the gas flow for the in-situ uranium mining as claimed in claim 1, wherein the control assembly (13) is further configured to adjust the solenoid valve (7) according to the pressure difference between the first pressure information and the second pressure information.

9. The control system of the gas flow for the in-situ uranium mining as claimed in claim 1, wherein the control assembly (13) is further configured to: in response to the pressure difference between the first pressure information and the second pressure information being between 0 and 0.01 megapascals (MPa), send a yellow alarm for indicating a gas injection risk of the control system; and in response to the pressure difference between the first pressure information and the second pressure information being less than 0, send a red alarm and control the solenoid valve (7) to be closed.

10. The control system of the gas flow for the in-situ uranium mining as claimed in claim 1, wherein the control assembly (13) is configured to control the gas mass flow controller.

* * * * *